(12) United States Patent
Yoon et al.

(10) Patent No.: US 12,061,390 B2
(45) Date of Patent: *Aug. 13, 2024

(54) DISPLAY APPARATUS AND METHOD OF MANUFACTURING THE SAME

(71) Applicant: Samsung Display Co., Ltd., Yongin-Si (KR)

(72) Inventors: Seon-Tae Yoon, Seoul (KR); Junghyun Kwon, Seoul (KR); Kisoo Park, Hwaseong-si (KR); Haeil Park, Seoul (KR); Moonjung Baek, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 70 days.

This patent is subject to a terminal disclaimer.

(21) Appl. No.: 17/886,070

(22) Filed: Aug. 11, 2022

(65) Prior Publication Data

US 2022/0382104 A1    Dec. 1, 2022

Related U.S. Application Data

(63) Continuation of application No. 17/110,380, filed on Dec. 3, 2020, now Pat. No. 11,442,309, which is a (Continued)

(30) Foreign Application Priority Data

Apr. 11, 2017  (KR) ........................ 10-2017-0046733

(51) Int. Cl.
*G02F 1/13357*    (2006.01)
*G02F 1/1335*    (2006.01)

(52) U.S. Cl.
CPC .. *G02F 1/133603* (2013.01); *G02F 1/133512* (2013.01); *G02F 1/133514* (2013.01);
(Continued)

(58) Field of Classification Search
CPC ......... G02F 1/133603; G02F 1/133512; G02F 1/133514; G02F 1/133528; G02F 1/133617; G02F 1/133548; G02F 1/133614
See application file for complete search history.

(56) References Cited

U.S. PATENT DOCUMENTS 8,294,848 B2    10/2012    Cho et al.
10,423,032 B2    9/2019    Lee et al.
(Continued)

FOREIGN PATENT DOCUMENTS

JP    2007-025621 A    2/2007
KR    10-2010-0111103 A    10/2010
(Continued)

*Primary Examiner* — Jamara A Franklin
(74) *Attorney, Agent, or Firm* — Innovation Counsel LLP

(57) ABSTRACT

A display apparatus includes a backlight unit comprising a light source emitting blue light, a green color conversion material and a red color conversion material, a first polarizer disposed on the backlight unit, a first base substrate disposed on the first polarizer, a thin film transistor disposed on the first base substrate, a second polarizer disposed on the thin film transistor, a first color conversion pattern and a second color conversion pattern disposed on the second polarizer, a first color filter disposed on the first color conversion pattern, a second color filter disposed on the second color conversion pattern, a second base substrate disposed on the first and second color filters, and a third polarizer disposed on the second base substrate and having a polarizing axis same as a polarizing axis of the second polarizer.

26 Claims, 15 Drawing Sheets

Related U.S. Application Data continuation of application No. 16/384,721, filed on Apr. 15, 2019, now Pat. No. 10,866,457, which is a continuation of application No. 15/823,163, filed on Nov. 27, 2017, now Pat. No. 10,281,767.

(52) U.S. Cl.
CPC .. *G02F 1/133528* (2013.01); *G02F 1/133617* (2013.01); *G02F 1/133548* (2021.01); *G02F 1/133614* (2021.01)

(56) References Cited

U.S. PATENT DOCUMENTS

| | | |
|---|---|---|
| 2006/0284532 A1 | 12/2006 | Kuhihara et al. |
| 2007/0064445 A1 | 3/2007 | Hatanaka et al. |
| 2009/0180055 A1 | 7/2009 | Kim et al. |
| 2013/0088692 A1 | 4/2013 | Su et al. |

FOREIGN PATENT DOCUMENTS

| | | |
|---|---|---|
| KR | 10-2016-0077482 A | 7/2016 |
| KR | 10-2016-0084557 A | 7/2016 |
| KR | 10-2016-0087492 A | 7/2016 |

DISPLAY APPARATUS AND METHOD OF MANUFACTURING THE SAME

This application is a continuation application of U.S. patent application Ser. No. 17/110,380 filed on Dec. 3, 2020, which is a continuation application of U.S. patent application Ser. No. 16/384,721 filed on Apr. 15, 2019, which is a continuation application of U.S. patent application Ser. No. 15/823,163 filed on Nov. 27, 2017 (now U.S. Pat. No. 10,281,767), which claims priority under 35 USC § 119 to Korean Patent Application No. 10-2017-0046733, filed on Apr. 11, 2017, the disclosures of which are incorporated by reference herein in their entirety.

BACKGROUND

1. Field

Example embodiments of the inventive concept relate to a display apparatus and a method of manufacturing the display apparatus. More particularly, example embodiments of the inventive concept relate to a display apparatus including a color conversion layer using photoluminescence and a method of manufacturing the display apparatus.

2. Description of the Related Art

Recently, a display apparatus having light weight and small size has been manufactured. A cathode ray tube (CRT) display apparatus has been used due to a performance and a competitive price. However the CRT display apparatus may have poor size or portability. Therefore a display apparatus such as a plasma display apparatus, a liquid crystal display apparatus and an organic light emitting display apparatus have been highly regarded due to their small size, light weight and low-power-consumption.

The display apparatus may further include a color conversion layer using photoluminescence. The color conversion layer may include color conversion structure for converting color of light such as a quantum dot. A desired color can be imparted to a image by the color conversion layer. Thus, color reproducibility of the image and the luminous efficiency can be improved, so that the display quality can be improved. However, the above-mentioned display apparatus having the color conversion layer has a problem in that it is complicated in structure, complicated in the manufacturing process, and high in manufacturing cost.

In addition, the display apparatus including the color conversion layer includes a ¼ polarizer (quarter wave polarizer) for reducing reflection of external light. There has been a problem of a loss in transmittance and an increase in manufacturing cost due to the ¼ polarizer.

SUMMARY

One or more example embodiment of the inventive concept provides a display apparatus capable of improving a transmittance, and having a simple structure.

One or more example embodiments of the inventive concept also provide a method of manufacturing the display apparatus.

According to an example embodiment of the inventive concept, a display apparatus includes a backlight unit comprising a light source emitting blue light, a green color conversion material and a red color conversion material, a first polarizer disposed on the backlight unit, a first base substrate disposed on the first polarizer, a thin film transistor disposed on the first base substrate, a second polarizer disposed on the thin film transistor, a first color conversion pattern and a second color conversion pattern disposed on the second polarizer, a first color filter disposed on the first color conversion pattern, a second color filter disposed on the second color conversion pattern, a second base substrate disposed on the first and second color filters, and a third polarizer disposed on the second base substrate and having a polarizing axis same as a polarizing axis of the second polarizer.

In an example embodiment, the first color filter may be a red color filter. The second color filter may be green color filter. The first color conversion pattern may include the red color conversion material, and the second color conversion pattern may include the green color conversion material.

In an example embodiment, the red color conversion material may be red quantum dot particles and/or red phosphor, and the green color conversion material may be green quantum dot particles and/or green phosphor.

In an example embodiment, the display apparatus may further include a third color conversion pattern disposed on the second polarizer and comprising scattering particles.

In an example embodiment, the third color conversion pattern may further include blue pigment.

In an example embodiment, the display apparatus may further include a third color filter which is a blue color filter disposed on the third color conversion pattern.

In an example embodiment, the display apparatus may further include a black matrix disposed on the second polarizer. The black matrix may be disposed between the first, second and third pixel areas to divide each of the first to third pixel areas. The first color filter and the first color conversion pattern may overlap the first pixel area. The second color filter and the second color conversion pattern may overlap the second pixel area. The third color conversion pattern may overlap the third pixel area.

In an example embodiment, the display apparatus may further include a scattering layer disposed under the first and second color conversion patterns and comprising scattering particles.

In an example embodiment, the red color conversion material and the green color conversion material may each contain about 5 to 25 wt % of a respective amount of the red color conversion material and the green color conversion material for emitting white light of the backlight unit.

In an example embodiment, the light source of the backlight unit may have a maximum peak wavelength of 455 nm or less.

In an example embodiment, the second polarizer may be a wire grid polarizer.

According to an example embodiment of the inventive concept, a display apparatus includes a backlight unit, a first polarizer disposed on a the backlight unit, a first base substrate disposed on the first polarizer, first to third thin film transistors disposed on the first base substrate, first to third pixel electrodes disposed on the first base substrate in first to third pixel areas, respectively, and electrically connected to the first to third thin film transistors, respectively, a second polarizer disposed on the first to third pixel electrodes, a black matrix disposed on the second polarizer, a first color conversion pattern disposed on the second polarizer in the first pixel area, a second color conversion pattern disposed on the second polarizer in the second pixel area, a first color filter disposed on the first color conversion pattern, a second color filter disposed on the second color conversion pattern, a second base substrate disposed on the first and second color filters, and a third polarizer disposed on the second base substrate and having a polarizing axis same as a polarizing axis of the second polarizer.

In an example embodiment, the backlight unit may include a light source emitting blue light, a green color conversion material and a red color conversion material. The first color filter may be a red color filter. The second color filter may be a green color filter. The first color conversion pattern may include the red color conversion material, and the second color conversion pattern may include the green color conversion material. The red color conversion material may be red quantum dot particles and/or red phosphor, and the green color conversion material may be green quantum dot particles and/or green phosphor.

In an example embodiment, the display apparatus may further include a third color conversion pattern disposed on the second base substrate in the third pixel area and including scattering particles and blue pigment.

In an example embodiment, the display apparatus may further include a third color filter which is a blue color filter disposed on the second base substrate in the third pixel area.

In an example embodiment, the red color conversion material and the green color conversion material may be each contain about 5 to 25 wt % of a respective amount of the red color conversion material and the green color conversion material for emitting white light of the backlight unit.

In an example embodiment, the light source of the backlight unit may have a maximum peak wavelength of 455 nm or less.

In an example embodiment, the display apparatus may further include a planarization layer disposed between the second polarizer and the first and second color conversion patterns, and a capping layer disposed between the second polarizer and the liquid crystal layer. The second polarizer may be a wire grid polarizer.

According to an example embodiment of the inventive concept, a method of manufacturing a display apparatus includes forming a thin film transistor on a first base substrate, forming a black matrix on a second base substrate, forming a first color filter and a second color filter on the second base substrate on which the black matrix is formed, forming a first color conversion pattern on the first color filter and a second color conversion pattern on the second color filter, forming a scattering layer on the first and second color conversion patterns, forming a planarization layer on the scattering layer, forming a second polarizer which is a wire grid polarizer on the planarization layer, forming a capping layer on the second polarizer, forming a liquid crystal layer between the first substrate and the second substrate, and forming a first polarizer on the first substrate, and forming a third polarizer on the second base substrate and having a polarizing axis same as a polarizing axis of the second polarizer.

In an example embodiment, the method may further include providing a backlight unit comprising a light source emitting blue light, a green color conversion material and a red color conversion material. The red color conversion material and the green color conversion material may each contain about 5 to 25 wt % of a respective amount of the red color conversion material and the green color conversion material for emitting white light of the backlight unit. The first color filter may be a red color filter. The second color filter may be a green color filter. The first color conversion pattern may include the red color conversion material, and the second color conversion pattern may include the green color conversion material. The light source of the backlight unit may have a maximum peak wavelength of 455 nm or less.

According to the present inventive concept, a display apparatus includes a backlight unit comprising a light source emitting blue light, a green color conversion material and a red color conversion material, a first polarizer disposed on the backlight unit, a liquid crystal TFT substrate disposed on the first polarizer and including a liquid crystal layer and a thin film transistor, a second polarizer disposed on the liquid crystal TFT, a photoluminescence substrate disposed on the second polarizer and including a first color conversion pattern and a second color conversion pattern disposed on first and second color filters, and a third polarizer disposed on the second base substrate and having a polarizing axis same as a polarizing axis of the second polarizer.

Accordingly, since the display apparatus does not include a ¼ wave polarizer to reduce reflection of external light, the transmittance may be improved, the structure may be simple, and the manufacturing cost may be reduced. In addition, In addition, the transmittance may be improved and the reflection of external light may be prevented by the second polarizer and the third polarizer which have the same polarizing axis, and by the black matrix absorbing light, comparing to the conventional ¼ polarizer.

In addition, a scattering layer may be formed under the first and second color conversion patterns, so that optical efficiency can be improved.

In addition, a blue LED having a maximum peak wavelength of 455 nm or less may be used as the light source of the backlight unit and a blue LED having a maximum peak wavelength of 450 nm which is relatively inexpensive. Thus, the manufacturing cost can be reduced. In addition, since the luminescence efficiency for a short wavelength of a quantum dot is higher than the luminescence efficiency for a long wavelength, so that the luminous efficiency of the first and second color conversion patterns and can be improved as the maximum peak wavelength of the light source is lower than the conventional one.

It is to be understood that both the foregoing general description and the following detailed description are exemplary and explanatory and are intended to provide further explanation of the invention as claimed.

BRIEF DESCRIPTION OF THE DRAWINGS

The above and other features of the inventive concept will become more apparent by describing in detail example embodiments thereof with reference to the accompanying drawings, in which.

DETAILED DESCRIPTION

Hereinafter, the inventive concept will be explained in detail with reference to the accompanying drawings.

Figure 1:
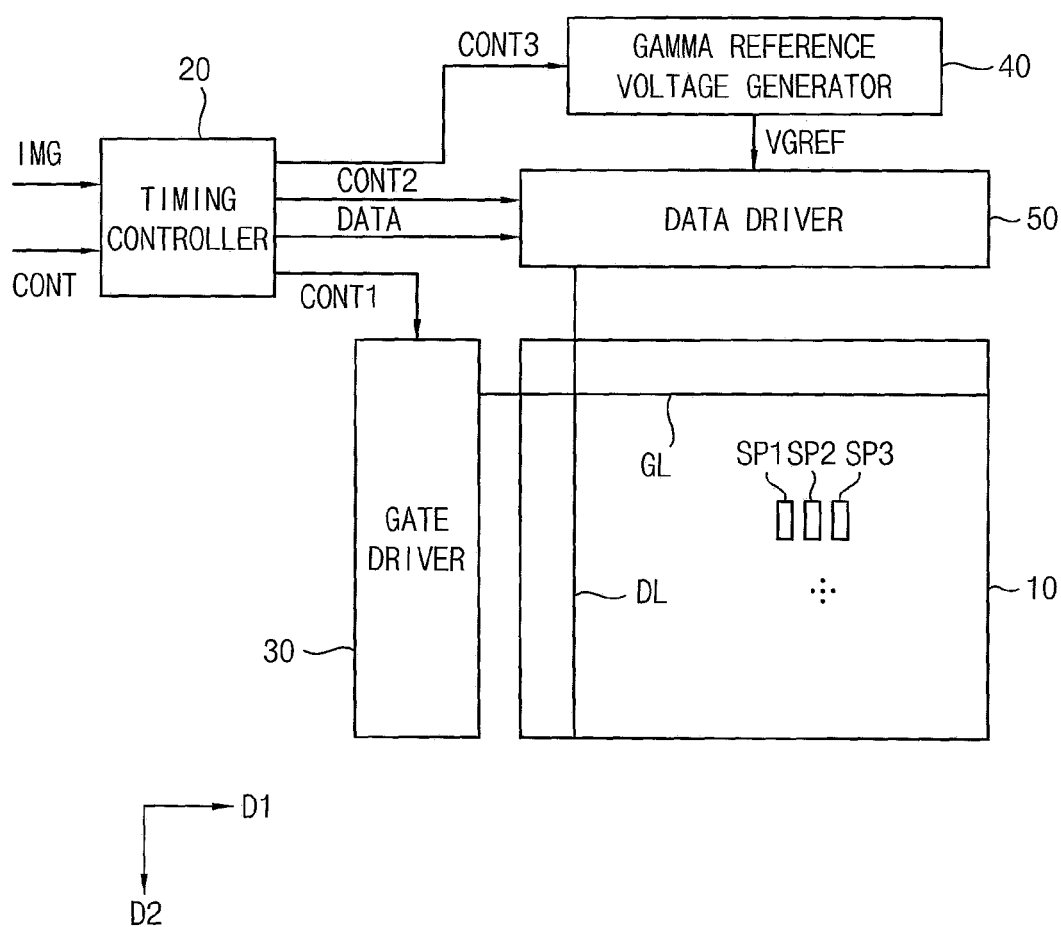
FIG. 1 is a block diagram illustrating a display apparatus according to an example embodiment of the inventive concept.

FIG. 1 is a block diagram illustrating a display apparatus according to an example embodiment of the inventive concept.

Referring to FIG. 1, the display apparatus may include a display panel 10 and a display panel driver. The display panel driver may include a timing controller 20, a gate driver 30, a gamma reference voltage generator 40 and a data driver 50. The display apparatus may further include a backlight unit (BLU of FIG. 2).

The display panel 10 may include a plurality of gate lines GL, a plurality of data lines DL, and a pixel electrodes electrically connected to the gate lines GL and the data lines DL, respectively. The pixel electrodes may include first to third pixel electrode corresponding to a first pixel area SP1, a second pixel area SP2 and a third pixel area SP3, respectively. Each of the first to third pixel areas may emit different color light. The gate lines GL may extend in a first direction D1, and the data lines DL may extend in a second direction D2 which crosses the first direction D1.

The display panel 10 may include a first substrate including the gate lines, the data lines, the pixel electrodes and the thin film transistors are formed thereon, a second substrate facing the first substrate and including a common electrode, and a liquid crystal layer between the first substrate and the second substrate.

Figure 2:
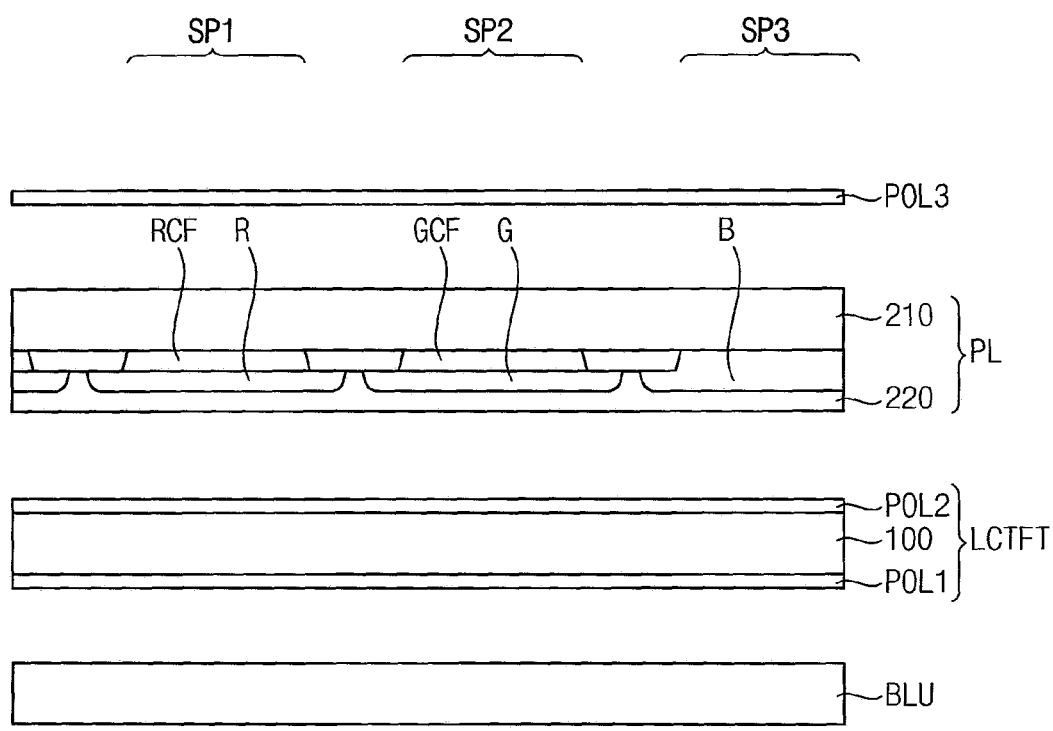
FIG. 2 is a cross-sectional view briefly illustrating the display apparatus of FIG. 1.

The structure of the display panel 10 may be explained referring to FIGS. 2 and 3 in detail.

The timing controller 20 may receive input image data IMG and an input control signal CONT from an external apparatus (not shown). The input image data may include red image data, green image data and blue image data. The input control signal CONT may include a master clock signal and a data enable signal. The input control signal CONT may further include a vertical synchronizing signal and a horizontal synchronizing signal.

The timing controller 20 may generate a first control signal CONT1, a second control signal CONT2, a third control signal CONT3 and a data signal DATA based on the input image data IMG and the input control signal CONT.

The timing controller 20 may generate the first control signal CONT1 for controlling an operation of the gate driver 30 based on the input control signal CONT, and outputs the first control signal CONT1 to the gate driver 30. The first control signal CONT1 may further include a vertical start signal and a gate clock signal.

The timing controller 20 may generate the second control signal CONT2 for controlling an operation of the data driver 50 based on the input control signal CONT, and outputs the second control signal CONT2 to the data driver 50. The second control signal CONT2 may include a horizontal start signal and a load signal.

The timing controller 20 may generate the data signal DATA based on the input image data IMG. The timing controller 20 may output the data signal DATA to the data driver 50.

The timing controller 20 may generate the third control signal CONT3 for controlling an operation of the gamma reference voltage generator 40 based on the input control signal CONT, and output the third control signal CONT3 to the gamma reference voltage generator 40.

The gate driver 30 may generate gate signals driving the gate lines GL in response to the first control signal CONT1 received from the timing controller 20. The gate driver 30 may sequentially output the gate signals to the gate lines GL.

The gamma reference voltage generator 40 may generate a gamma reference voltage VGREF in response to the third control signal CONT3 received from the timing controller 200. The gamma reference voltage generator 40 may provide the gamma reference voltage VGREF to the data driver 50. The gamma reference voltage VGREF may have a value corresponding to a level of the data signal DATA.

In an exemplary embodiment, the gamma reference voltage generator 40 may be disposed in the timing controller 20, or in the data driver 50.

The data driver 50 may receive the second control signal CONT2 and the data signal DATA from the timing controller 20, and receive the gamma reference voltages VGREF from the gamma reference voltage generator 40. The data driver 50 may convert the data signal DATA into data voltages having an analog type using the gamma reference voltages VGREF. The data driver 50 may output the data voltages to the data lines DL.

FIG. 2 is a cross-sectional view illustrating the display apparatus of FIG. 1

Referring to FIG. 2, the display apparatus may include a backlight unit BLU, a liquid crystal TFT substrate LCTFT, and a photoluminescence substrate PL and a third polarizer POL3.

The backlight unit BLU may be disposed under the liquid crystal TFT substrate LCTFT to provide light to the liquid crystal TFT substrate LCTFT. More particularly, the backlight unit BLU may include a light source generating blue light, a red color conversion material and green color conversion material. The red color conversion material may be red quantum dot particles and/or red phosphor. The green color conversion material may be green quantum dot particles and/or green phosphor. Here, the red color conversion material and/or red phosphor in the backlight unit BLU may be only about 5 to 25 wt % of a total weight of the red quantum dot particles and/or red phosphor used in a comparative example for emitting white light from the backlight unit BLU. In addition, the green color conversion material and/or green phosphor may contain only about 5 to 25 wt % of an amount of the green quantum dot particles and/or green phosphor used in the comparative example for emitting white light from the backlight unit BLU. If amounts of the green color conversion material and the red color conversion material are defined as 100 wt % each when the backlight unit BLU, in the comparative example, includes the green color conversion material and the red color conversion material to emit white light, amounts of the green color conversion material and the red color conversion material of the present example embodiment is about 5 to 25 wt % compared to the comparative example.

Thus, the backlight unit BLU may include the light source emitting the blue light, and only a small amount of the red color conversion material and/or red phosphor and the green color conversion material and/or green phosphor. Accordingly, the backlight unit BLU may provide sky blue light to the liquid crystal TFT substrate LCTFT.

Here, the light source emitting the blue light may have a maximum peak wavelength of 455 nm (nanometer) or less. For example, the light source may be a blue LED having a maximum peak wavelength of 450 nm.

The liquid crystal TFT substrate LCTFT may include a liquid crystal panel 100 including a liquid crystal layer and a thin film transistor, a first polarizer POL1 and a second polarizer POL2.

The liquid crystal layer may include liquid crystal molecules having optical anisotropy. The liquid crystal molecules are driven by electric field, so that an image is displayed by passing or blocking light through the liquid crystal layer.

The first polarizer POL1 may be disposed between the liquid crystal pane 100 and the backlight unit BLU. The first polarizer POL1 may be an absorbing type polarizing plate such as a general polyvinyl alcohol (PVA) polarizing plate or a reflection type polarizing plate such as a wire grid polarizer.

The second polarizer POL2 may be disposed between the liquid crystal panel 100 and the photoluminescence substrate PL. The second polarizer POL2 may be an absorbing type polarizing plate such as a general polyvinyl alcohol (PVA) polarizing plate or a reflection type polarizing plate such as a wire grid polarizer. A polarizing axis of the second polarizer POL2 may be perpendicular to a polarizing axis of the first polarizer POLE The photoluminescence substrate PL may include a second base substrate 210, a black matrix BM, a first color filter RCF, a second color filter GCF, a first color conversion pattern R, a second color conversion pattern G, a third color conversion pattern B and a scattering layer 220.

The second base substrate 210 may include a transparent insulation substrate. For example, the second base substrate 210 may include a glass substrate, a quartz substrate, a transparent resin substrate, etc. Examples of the transparent resin substrate for the second base substrate 210 may include polyimide-based resin, acryl-based resin, polyacrylate-based resin, polycarbonate-based resin, polyether-based resin, sulfonic acid containing resin, polyethyleneterephthalate-based resin, etc.

The black matrix BM may be disposed on the second base substrate 210. The black matrix BM may include a light blocking material. For example, the black matrix BM may include an organic material that absorbs light. The black matrix BM may be disposed between the first, second, and third pixel areas SP1, SP2, and SP3 to divide each of the pixel areas. In some example embodiment, the black matrix BM may include a metal that blocks light.

The first color filter RCF may be disposed on the second base substrate 210 in the first pixel area SP1. The first color filter RCF may be a red color filter. The first color filter RCF may pass only a wavelength band corresponding to red light of the light passing through the first color filter RCF.

The second color filter GCF may be disposed on the second base substrate 210 in the second pixel area SP2. The second color filter GCF may be a green color filter. The second color filter GCF may pass only a wavelength band corresponding to green light of the light passing through the second color filter GCF.

The first color conversion pattern R may be disposed on the first color filter RCF to overlap the first pixel area SP1. The first color conversion pattern R may be a red color conversion pattern. The first color conversion pattern R may convert the blue light provided from the backlight unit BLU into red light. For example, the first color conversion pattern R may include red quantum dot particles and/or red phosphor. Here, the backlight unit BLU includes about 5 to 25 wt % of the red quantum dot particles and/or red phosphor, so that the first color conversion pattern R may include the remainder of about 75 to 95 wt % of the red quantum dot particles and/or the red phosphors.

The second color conversion pattern G may be disposed on the second color filter GCF to overlap the second pixel area SP2. The second color conversion pattern G may be a green color conversion pattern. The second color conversion pattern G may convert the blue light provided from the backlight unit BLU into green light. For example, the second color conversion pattern G may include green quantum dot particles and/or green phosphor. the backlight unit BLU. Here, the backlight unit BLU includes about 5 to 25 wt % of the green quantum dot particles and/or green phosphor, so that the second color conversion pattern G may include the remainder of about 75 to 95 wt % of the green quantum dot particles and/or the green phosphors.

The red or green quantum dot may be a material that has a nanoscale structure and may include several hundred to several thousand atoms. Since the quantum dot is very small in size, a quantum confinement effect may occur. The quantum confinement effect may indicate that an energy band gap of an object is increased when the object becomes smaller than nano size. When the light having energy higher than that of the band gap is incident to the quantum dot, the quantum dot may absorb the light and may emit a second light having a specific wavelength and an energy level in the ground state. The wavelength of the emitted second light may have a value corresponding to the band gap. When a size and a composition of the quantum dot are adjusted, the emission property of the quantum dot may be controlled by the quantum confinement.

The composition of the quantum dots is not limited to a specific composition, and any suitable composition may be used. For example, the quantum dot may be a quantum dot of Group II-VI elements, Group III-V elements, Group IV elements, or Group IV-VI elements. The Group II elements may be selected from the group consisting of at least one of zinc, cadmium, and mercury. The Group III elements may be selected from the group consisting of at least one of aluminum, gallium, and indium. The Group IV elements may be selected from the group consisting of at least one of silicon, germanium, tin, and lead. The Group V elements may be selected from the group consisting of at least one of nitrogen, phosphorus, and arsenic. The Group VI elements may be selected from the group consisting of at least one of sulfur, selenium, and tellurium.

The third color conversion pattern B may be disposed on the second base substrate 210 to overlap the third pixel area SP3. The third color conversion pattern B may include scattering particles that change traveling direction of light passing therethrough without changing color. The scattering particles may be particles of TiO2 or the like. Here, the third color conversion pattern B may include blue pigment for converting light passing therethrough to blue light, and size of the scattering particle may be similar to size of the red quantum dot particle or the green quantum dot particle. In addition, the third color conversion pattern B may further include a blue pigment for converting light passing therethrough to blue light. In some example embodiments, the third color conversion pattern B may include blue quantum dot particles and/or blue phosphor similarly to the first and second color conversion patterns R and G.

The scattering layer 220 may be disposed on the first to third color conversion patterns R, G and B. The scattering layer 220 may be disposed corresponding to entire of the first to third pixel areas SP1 to SP3. The scattering layer 220 may include scattering particles that change traveling direction of light passing therethrough without changing color. The scattering particles may be particles of TiO2 or the like. In some example embodiment, a planarization layer including an insulating material and including a flat upper surface may be disposed instead of the scattering layer 220.

The third polarizer POL3 may be disposed on the photoluminescence substrate PL. Thus, the photoluminescence substrate PL may be disposed between the third polarizer POL3 and the liquid crystal TFT substrate LCTFT. The third polarizer POL3 may be a traditional leaner polarizer. For example, the third polarizer POL3 may be an absorbing type polarizing plate such as a general polyvinyl alcohol (PVA) polarizing plate. A polarizing axis of the third polarizer POL3 may be the same as the polarizing axis of the second polarizer POL2. When the polarizing axis of the third polarizer POL3 and the polarizing axis of the second polarizer POL2 are the same, the light passing through the second polarizer POL2 passes through the third polarizer POL3 and the transmittance can be maximized.

According to the present embodiment, since the display apparatus does not include a ¼ wave polarizer to reduce reflection of external light, transmittance may be improved, the structure may be simple, and the manufacturing cost may be reduced. In addition, the transmittance may be improved and the reflection of external light may be prevented by the second polarizer POL2 and the third polarizer POL3 which have the same polarizing axis, and by the black matrix BM absorbing light, compare to the conventional ¼ polarizer.

In addition, the scattering layer is formed under the first and second color conversion patterns R and G, so that light efficiency may be increased.

In addition, a blue light emitting diode (LED) having a maximum peak wavelength of 455 nm or less may be used as the light source of the backlight unit BLU. A blue LED with a maximum peak wavelength of 450 nm, which is relatively inexpensive, can be used. Thus, the manufacturing cost can be reduced. In addition, since the luminescence efficiency for a short wavelength of a quantum dot is higher than the luminescence efficiency for a long wavelength, the luminous efficiency of the first and second color conversion patterns R and G can be improved as the maximum peak wavelength of the light source is lower that of the conventional light source.

Although the pixel electrodes of the display apparatus are formed on the lower substrate and the common electrodes are formed on the upper substrate in this embodiment, the structure of the display apparatus is not limited thereto. For example, the common electrode and the pixel electrode may be formed on the lower substrate or have different shapes depending on the mode of the liquid crystal TFT substrate of the display apparatus.

Figure 3A:
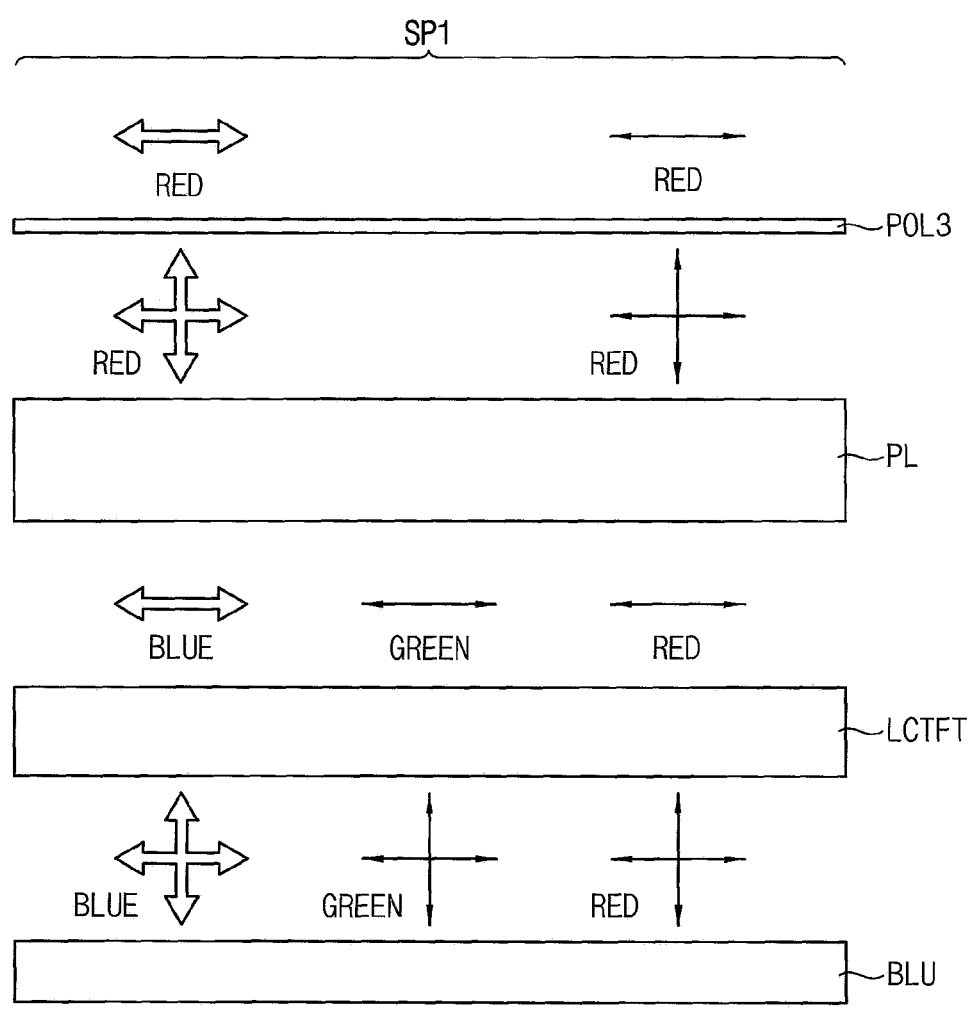
FIG. 3A is a cross-sectional view illustrating color conversion of the display apparatus of FIG. 2 in a first pixel area.

FIG. 3A is a cross-sectional view illustrating color conversion of the display apparatus of FIG. 2 in a first pixel area.

Referring to FIGS. 3A and 2, the display apparatus may emit red light in the first pixel area SP1. Light generated in the backlight unit BLU may include a blue component BLUE, a small amount of green component GREEN, and a small amount of red component RED. The light passes through the liquid crystal TFT substrate LCTFT and can be converted into polarized blue light, polarized green light and polarized red light. The polarized blue light, the polarized green light and the polarized red light passes through the photoluminescence substrate PL and can be converted into non-polarized red light from the blue light component generated in the backlight unit BLU and non-polarized red light from the small amount of red light component generated in the backlight unit BLU. And then, the non-polarized red light passes through the third polarizing element POL3 and may be finally emitted as polarized red light.

Figure 3B:
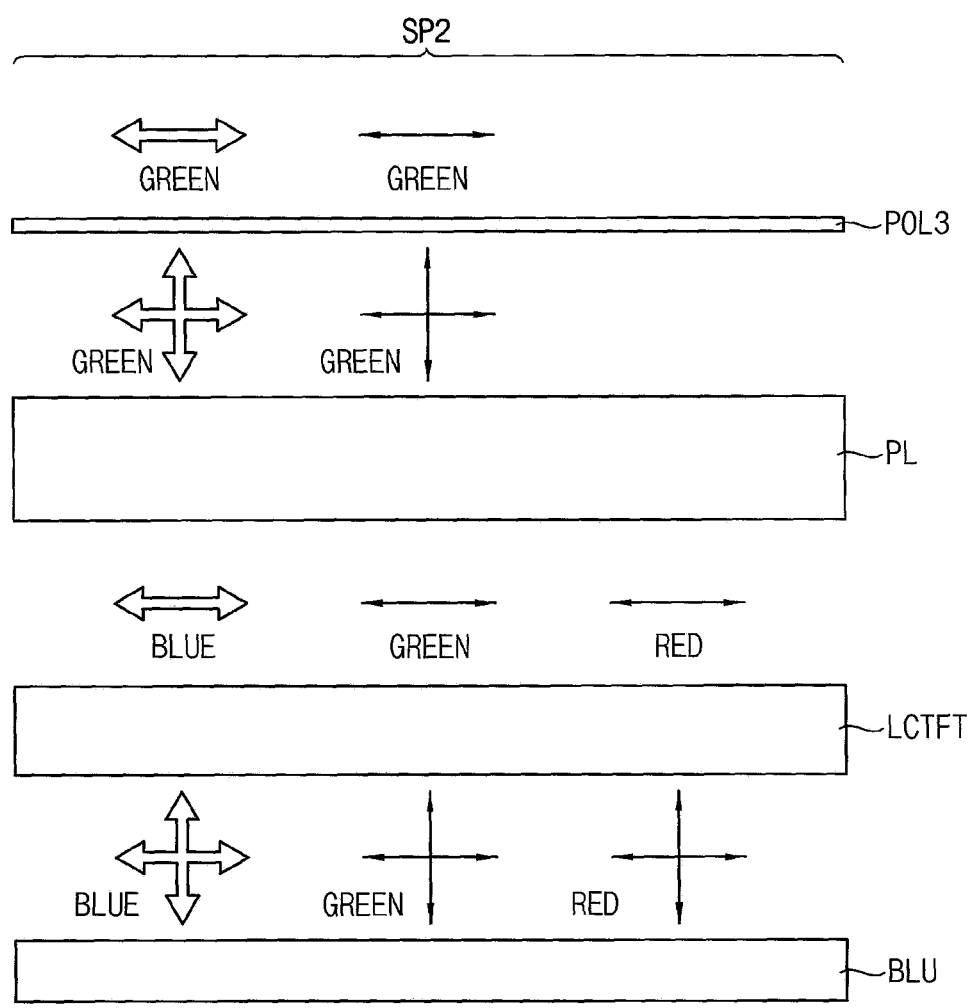
FIG. 3B is a cross-sectional view illustrating color conversion of the display apparatus of FIG. 2 in a second pixel area.

FIG. 3B is a cross-sectional view illustrating color conversion of the display apparatus of FIG. 2 in a second pixel area.

Referring to FIGS. 3B and 2, the display apparatus may emit green light in the second pixel area SP2. Light generated in the backlight unit BLU may include a blue component BLUE, a small amount of green component GREEN, and a small amount of red component RED. The light passes through the liquid crystal TFT substrate LCTFT and can be converted into polarized blue light, polarized green light and polarized red light. The polarized blue light, the polarized green light and the polarized red light passes through the photoluminescence substrate PL and can be converted into non-polarized green light from the blue light component generated in the backlight unit BLU and non-polarized green light from the small amount of green light component generated in the backlight unit BLU. And then, the non-polarized green light passes through the third polarizing element POL3 and may be finally emitted as polarized green light.

Figure 3C:
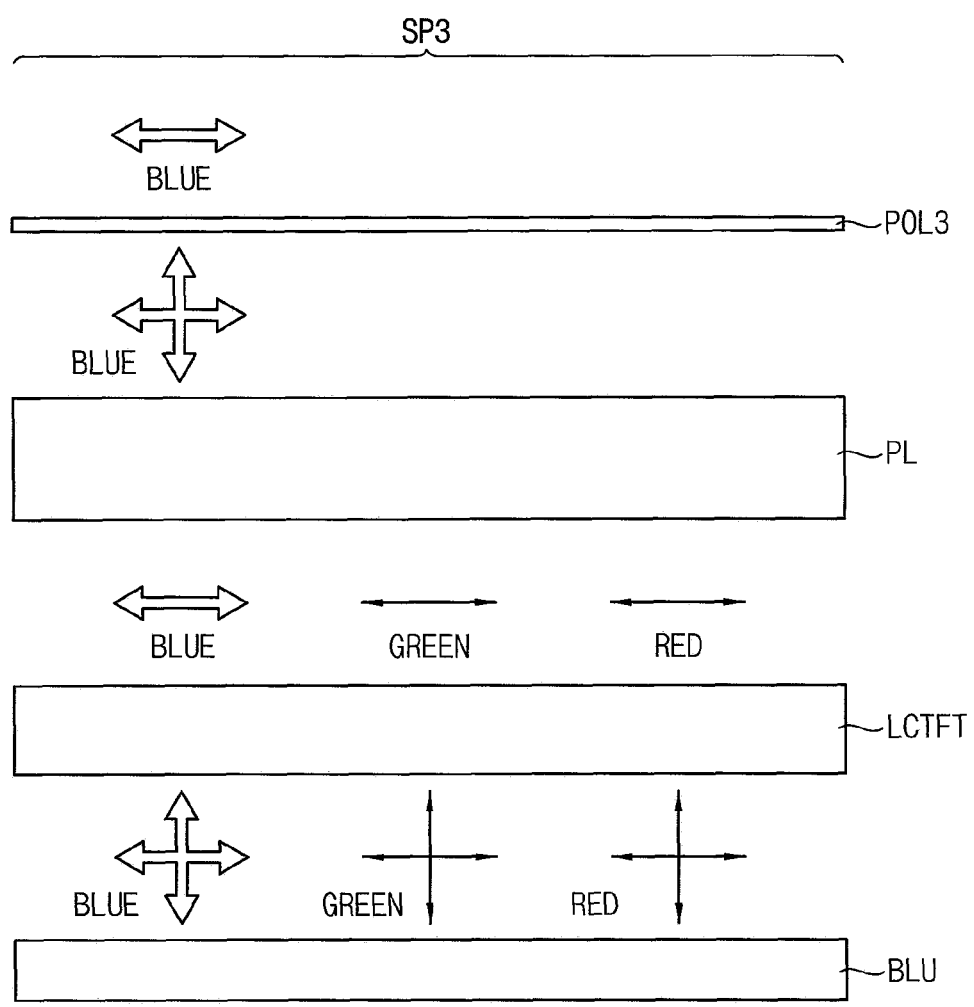
FIG. 3C is a cross-sectional view illustrating color conversion of the display apparatus of FIG. 2 in a third pixel area.

FIG. 3C is a cross-sectional view illustrating color conversion of the display apparatus of FIG. 2 in a third pixel area.

Referring to FIGS. 3C and 2, the display apparatus may emit blue light in the third pixel area SP3. Light generated in the backlight unit BLU may include a blue component BLUE, a small amount of green component GREEN, and a small amount of red component RED. The light passes through the liquid crystal TFT substrate LCTFT and can be converted into polarized blue light, polarized green light and polarized red light. The polarized blue light, the polarized green light and the polarized red light passes through the photoluminescence substrate PL and can be converted into non-polarized blue light from the blue light component generated in the backlight unit BLU. And then, the non-polarized blue light passes through the third polarizing element POL3 and may be finally emitted as polarized blue light.

Accordingly, even if the backlight unit BLU emits sky blue light, it is possible to emit red light, green light and blue light in the first, second and third pixel regions SP1, SP2 and SP3, respectively.

Figure 4:
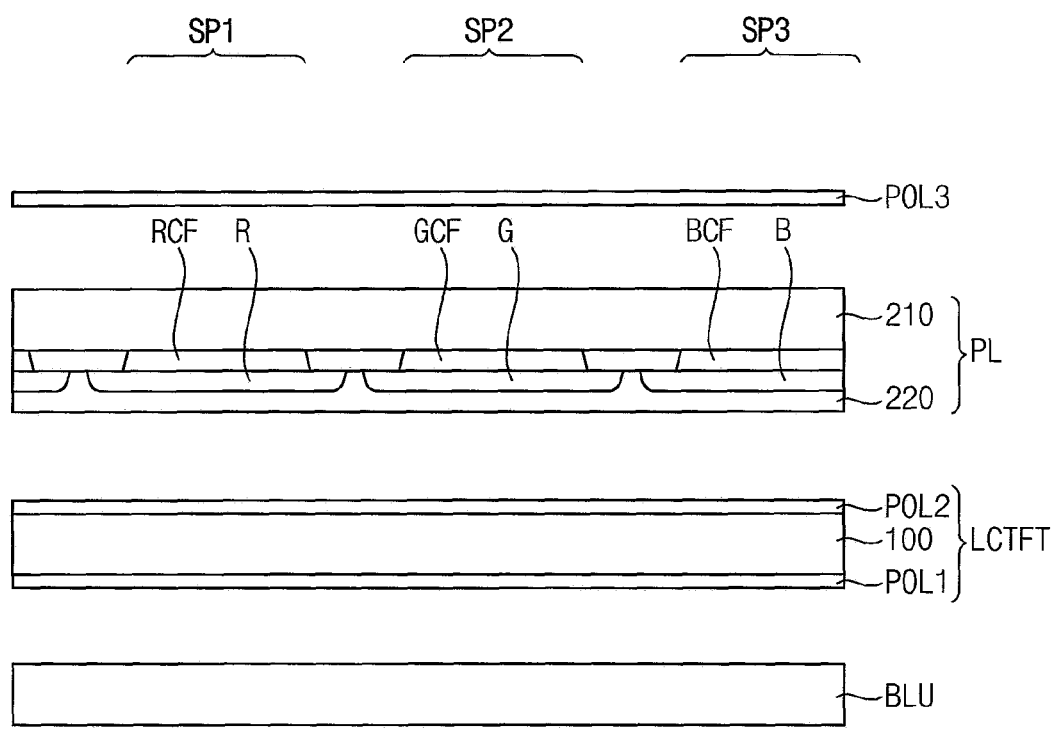
FIG. 4 is a cross-sectional view briefly illustrating a display apparatus according to an example embodiment of the inventive concept.

FIG. 4 is a cross-sectional view briefly illustrating a display apparatus according to an example embodiment of the inventive concept.

Referring to FIG. 4, the display apparatus may be substantially the same as the display apparatus of FIG. 2 except that the display apparatus further includes a third color filter BCF instead of blue pigment of the third color conversion pattern B. Thus, any further detailed descriptions concerning the same elements will be omitted or briefly described.

The display apparatus may include a backlight unit BLU, a liquid crystal TFT substrate LCTFT, and a photoluminescence substrate PL and a third polarizer POL3.

The backlight unit BLU may be disposed under the liquid crystal TFT substrate LCTFT to provide sky blue light to the liquid crystal TFT substrate LCTFT. The liquid crystal TFT substrate LCTFT may include a liquid crystal panel 100 including a liquid crystal layer and a thin film transistor, a first polarizer POL1 and a second polarizer POL2.

The photoluminescence substrate PL may include a second base substrate 210, a black matrix BM, a first color filter RCF, a second color filter GCF, a third color filter BCF, a first color conversion pattern R, a second color conversion pattern G, a third color conversion pattern B and a scattering layer 220.

The third color filter BCF may be disposed on the second substrate 210 in a third pixel area SP3. The third color filter BCF may be a blue color filter. The third color filter BCF may pass only a wavelength band corresponding to blue light of the light passing through the third color filter BCE The third color conversion pattern B third color conversion pattern B may be disposed on the second base substrate 210 in a third pixel area SP3. The third color conversion pattern B may include scattering particles that change traveling direction of light passing therethrough without changing color. The scattering particles may be particles of TiO2 or the like, and a size of the scattering particle may be similar to size of red quantum dot particle or green quantum dot particle. Thus, the third color conversion pattern B may include the same material as the scattering layer 220. In some example embodiments, the third color conversion pattern B may include blue quantum dot particles and/or blue phosphor.

Although the third color conversion pattern B and the scattering layer 220 are formed as separate layers in the present example embodiment, since the third color conversion pattern B and the scattering layer 220 include the same material, it is also possible to form one layer through one process in another example embodiment.

Figure 5:
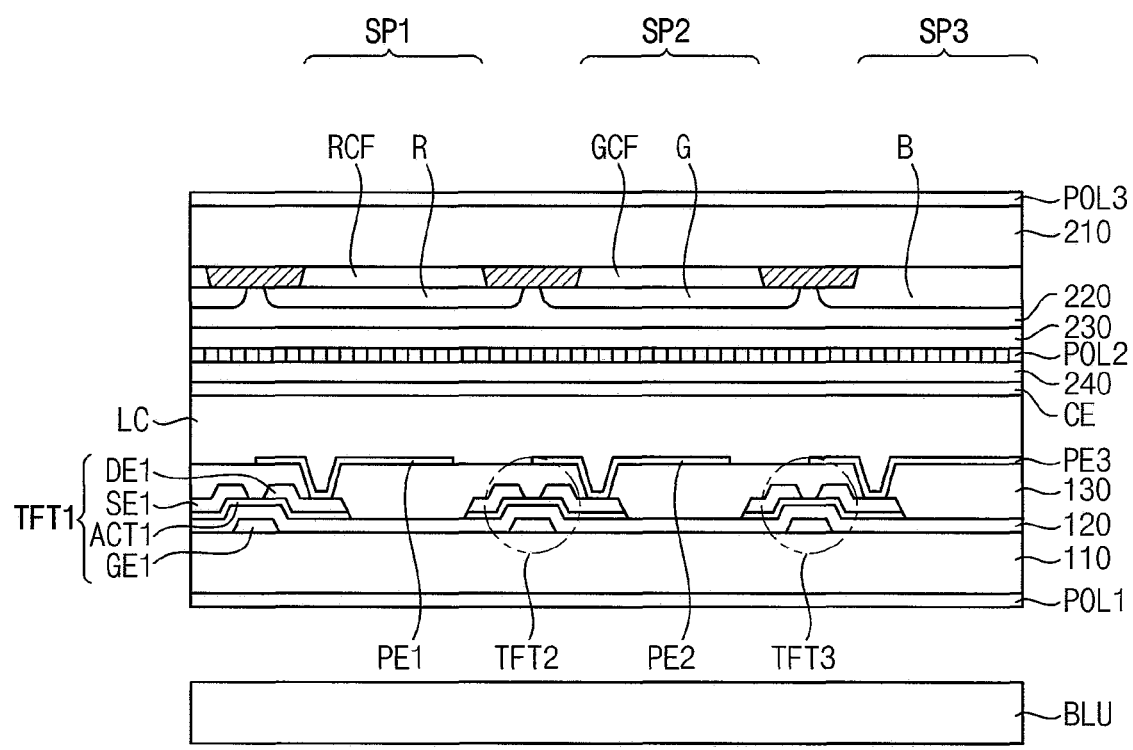
FIG. 5 is a cross-sectional view illustrating a display apparatus according to an example embodiment of the inventive concept.

FIG. 5 is a cross-sectional view illustrating a display apparatus according to an example embodiment of the inventive concept.

Referring to FIG. 5, the display apparatus may include a backlight unit BLU, a first base substrate 110, a first polarizer POL1, a gate pattern, a first insulation layer 120, a data pattern, a second insulation layer 130, first to third pixel electrodes PE1, PE2 and PE3, a liquid crystal layer LC, a second base substrate 210, a black matrix BM, a first color filter RCF, a second color filter GCF, a first color conversion pattern R, a second color conversion pattern G, a third color conversion pattern B, a scattering layer 220, a planarization layer 230, a second polarizer POL2, a capping layer 240, a common electrode CE, and a third polarizer POL3.

The backlight unit BLU may be substantially the same as the backlight unit of FIG. 2.

The first base substrate 110 may include a transparent insulation substrate. For example, the first base substrate 110 may include a glass substrate, a quartz substrate, a transparent resin substrate, etc. Examples of the transparent resin substrate for the first base substrate 110 may include polyimide-based resin, acryl-based resin, polyacrylate-based resin, polycarbonate-based resin, polyether-based resin, sulfonic acid containing resin, polyethyleneterephthalate-based resin, etc.

The first polarizer POL1 may be disposed under the first base substrate 110. Thus, the first polarizer POL1 may be disposed between the first base substrate 110 and the backlight unit BLU. The first polarizer POL1 may be substantially the same as the second polarizer POL2 of FIG. 2. The first polarizer POL1 may be an absorbing type polarizing plate such as a general polyvinyl alcohol (PVA) polarizing plate which is attached on the first base substrate 110. In some example embodiment, the first polarizer POL1 may be a reflection type polarizing plate such as a wire grid polarizer which is formed on the first base substrate 110. Here, the first polarizer POL1 may be formed between the first base substrate 110 and the liquid crystal layer LC.

The gate pattern may be formed on the first base substrate 110. The gate pattern may include a first gate electrode GE1, a second gate electrode, a third gate electrode, and a signal line for transmitting signals for driving the display apparatus such as a gate line. The gate pattern may include metal. For example, the gate pattern may include copper (Cu), titanium (Ti), molybdenum (Mo), aluminum (Al), silver (Ag), tungsten (W), nickel (Ni), chromium (Cr), platinum Ta), neodymium (Nd), scandium (Sc), etc. In addition, the gate pattern may include a plurality of metal layers. Although not shown, a buffer layer may be further formed between the gate pattern and the first base substrate 110.

The first insulation layer 120 may be disposed on the first base substrate 110 on which the gate pattern is disposed. The first insulation layer 120 may include an inorganic material such as silicon compound, metal oxide, etc. For example, the first insulation layer 120 may be formed using silicon oxide (SiOx), silicon nitride (SiNx), silicon oxynitride (SiOxNy), aluminum oxide (AlOx), tantalum oxide (TaOx), hafnium oxide (HfOx), zirconium oxide (ZrOx), titanium oxide (TiOx), etc. These may be used alone or in a combination thereof. In some example embodiment, the first insulation layer 120 may have a substantially planar top surface while sufficiently covering the gate pattern. In some example embodiment, the first insulation layer 120 may be formed with a substantially uniform thickness on the first base substrate 110 along a profile of the gate pattern. In this case, the first insulation layer 120 may have a relatively thin thickness, and a stepped portion adjacent to the gate pattern may be formed in the first insulation layer 120.

An active layer including a first active pattern ACT1, a second active pattern and a third active pattern may be formed on the first insulation layer 110. The first active pattern ACT1, the second active pattern and the third active pattern may overlap the first gate electrode GE1, the second gate electrode, and the third gate electrode. Each of the first active pattern ACT1, the second active pattern and the third active pattern may include a semiconductor layer consisting of amorphous silicon (a-Si:H) and an ohmic contact layer consisting of n+ amorphous silicon (n+a-Si:H).

The data pattern may be disposed on an active pattern layer. The data pattern may be disposed on the active pattern. The data pattern may include a first source electrode SE1, a first drain electrode DE1, a second source electrode, a third source electrode and a signal line for transmitting signals for driving the display apparatus such as a data line. The data pattern may include metal. For example, the data pattern may include copper (Cu), titanium (Ti), molybdenum (Mo), aluminum (Al), silver (Ag), tungsten (W), nickel (Ni), chromium (Cr), platinum Ta), neodymium (Nd), scandium (Sc), etc. In addition, the data pattern may include a plurality of metal layers.

The second insulation layer 130 may be disposed on the first insulation layer 120 on which the data pattern is disposed. The second insulation layer 130 may include an organic insulation material or an inorganic insulation material. In some example embodiment, the second insulation layer 130 may have a substantially planar top surface while sufficiently covering the data pattern. In some example embodiment, the second insulation layer 130 may be formed with a substantially uniform thickness on the first insulation layer 120 on which the data pattern is disposed.

The first gate electrode GE1, the first active pattern ACT1, the first source electrode SE1 and the first drain electrode DE1 may be included in a first thin film transistor TFT1. The second gate electrode, the second active pattern, the second source electrode and the second drain electrode may be included in a second thin film transistor TFT2. The third gate electrode, the third active pattern, the third source electrode and the third drain electrode may be included in a third thin film transistor TFT3.

The first to third pixel electrodes PE1, PE2 and PE3 may be disposed on the second insulation layer 130. The first pixel electrode PE1 may be electrically connected to the first drain electrode DE1 of the first thin film transistor TFT1 through a contact hole formed through the second insulation layer 130. The second pixel electrode PE2 may be electrically connected to the second drain electrode of the second thin film transistor TFT2 through a contact hole formed through the second insulation layer 130. The third pixel electrode PE3 may be electrically connected to the third drain electrode of the third thin film transistor TFT3 through a contact hole formed through the second insulation layer 130. The first to third pixel electrodes PE1, PE2 and PE3 may include a transparent conductive material. For example, the first to third pixel electrodes PE1, PE2 and PE3 may include indium tin oxide (ITO), indium zinc oxide (IZO), etc.

The second base substrate 210, the black matrix BM, the first color filter RCF, the second color filter GCF, the first color conversion pattern R, the second color conversion pattern G, the third color conversion pattern B, and the scattering layer 220 may be substantially the same as the second base substrate, the black matrix, the first color filter, the second color filter, the first color conversion pattern, the second color conversion pattern, the third color conversion pattern, and the scattering layer of the photoluminescence substrate of FIG. 2.

The planarization layer 230 may be disposed on the scattering layer 220. The planarization layer 230 may have a flat top surface and may include inorganic or organic insulation material.

The second polarizer POL2 may be disposed on the planarization layer 230. The second polarizer POL2 may be substantially the same as the second polarizer of FIG. 2. The second polarizer POL2 may be a wire grid polarizer. The wire grid polarizer may include a plurality of fine lines extending in one direction and formed at uniform intervals to form a wire grid. The fine lines may have pitch of about 50 nm (nanometers) to 150 nm. The pitch may be defined as sum of width of one of the fine line and a distance between fine lines disposed adjacent to each other.

The capping layer 240 may be disposed on the wire gird polarizer, so that the capping layer 240 may cap the wire grid polarizer. The capping layer 240 may include organic or inorganic insulation material.

The common electrode CE may be disposed on the capping layer 240. A common voltage may be applied to the common electrode CE. The common electrode CE may include a transparent conductive material. For example, the common electrode CE may include indium tin oxide (ITO), indium zinc oxide (IZO) and etc.

The third polarizer POL3 may be disposed on the second base substrate 210. The third polarizer POL3 may be substantially the same as the third polarizer of FIG. 2. The third polarizer POL3 may be an absorbing type polarizing plate such as a general polyvinyl alcohol (PVA) polarizing plate attached on the second base substrate 210.

The liquid crystal layer LC may between the first to third pixel electrodes PE1, PE2 and PE3 and the common electrode CE. The liquid crystal layer LC may include liquid crystal molecules having optical anisotropy. The liquid crystal molecules are driven by electric field, so that an image is displayed by passing or blocking light through the liquid crystal layer LC.

Figure 6:
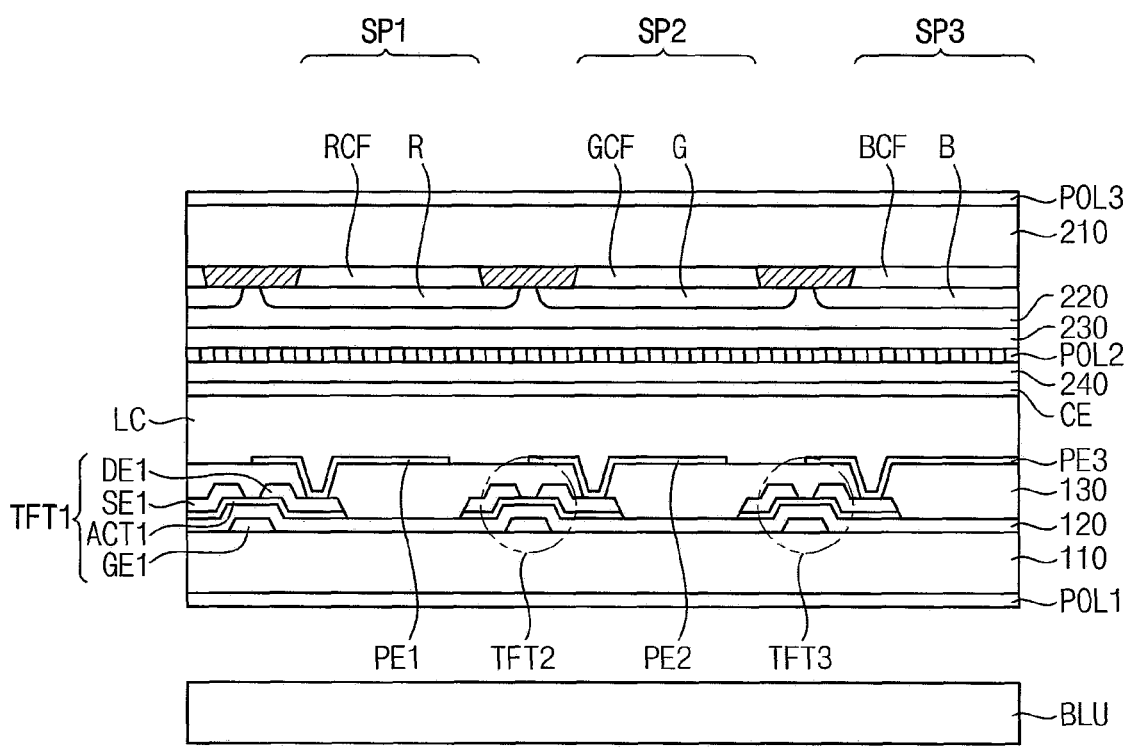
FIG. 6 is a cross-sectional view illustrating a display apparatus according to an example embodiment of the inventive concept.

FIG. 6 is a cross-sectional view illustrating a display apparatus according to an example embodiment of the inventive concept.

Referring to FIG. 6, the display apparatus may be substantially same as the display apparatus of FIG. 5 except that the display apparatus further includes a third color filter BCF instead of blue pigment of the third color conversion pattern B. Thus, any further detailed descriptions concerning the same elements will be omitted or briefly described.

The display apparatus may include a backlight unit BLU, a first base substrate 110, a first polarizer POL1, a gate pattern, a first insulation layer 120, a data pattern, a second insulation layer 130, first to third pixel electrodes PE1, PE2 and PE3, a liquid crystal layer LC, a second base substrate 210, a black matrix BM, a first color filter RCF, a second color filter GCF, a third color filter BCF, a first color conversion pattern R, a second color conversion pattern G, a third color conversion pattern B, a scattering layer 220, a planarization layer 230, a second polarizer POL2, a capping layer 240, a common electrode CE, and a third polarizer POL3.

The backlight unit BLU, the first base substrate 110, the first polarizer POL1, the gate pattern, the first insulation layer 120, the data pattern, the second insulation layer 130, the first to third pixel electrodes PE1, PE2 and PE3, and the liquid crystal layer LC, the planarization layer 230, the second polarizer POL2, the capping layer 240, the common electrode CE, and the third polarizer POL3 may be substantially the same as the backlight unit, the first base substrate, the first polarizer, the gate pattern, the first insulation layer, the data pattern, the second insulation layer, the first to third pixel electrodes, and the liquid crystal layer, the planarization layer, the second polarizer, the capping layer, the common electrode, and the third polarizer of the display apparatus of FIG. 4.

The second base substrate 210, the black matrix BM, the first color filter RCF, the second color filter GCF, the third color filter BCF, the first color conversion pattern R, the second color conversion pattern G, the third color conversion pattern B and the scattering layer 220 may be substantially the same as the second base substrate, the black matrix, the first color filter, the second color filter, the third color filter, the first color conversion pattern, the second color conversion pattern, the third color conversion pattern and the scattering layer of the display apparatus of FIG. 4.

FIGS. 7A, 7B, 7C, 7D, 7E, 7F, 7G, 7H, and 7I are cross-sectional views illustrating a method of manufacturing the display apparatus of FIG. 5.

Figure 7A:
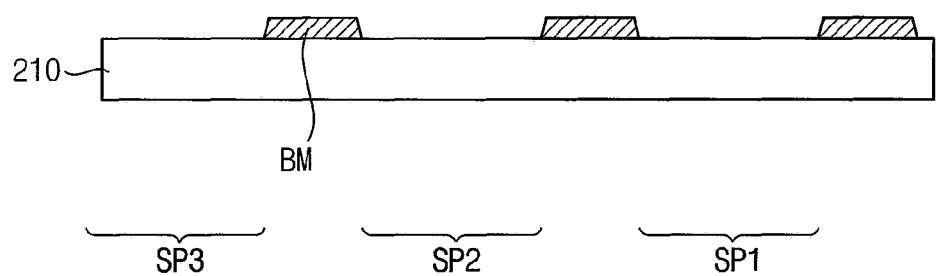
FIGS. 7A, 7B, 7C, 7D, 7E, 7F, 7G, 7H, and 7I are cross-sectional views illustrating a method of manufacturing the display apparatus of FIG. 5.

Referring to FIG. 7A, a black matrix BM may be formed in a second base substrate 210. For example, the black matrix BM may be formed by forming a photoresist layer on the second base substrate 210, exposing and developing the photoresist layer.

Figure 7B:
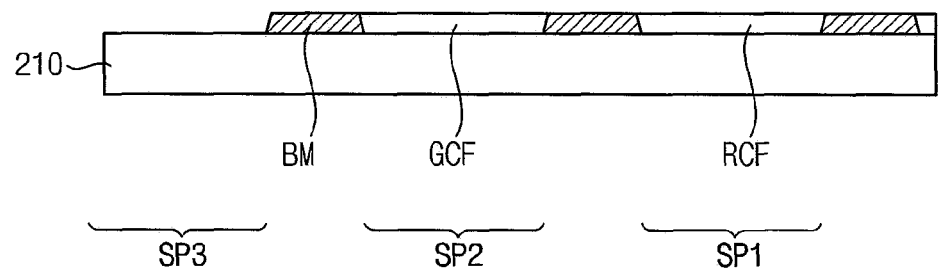

Referring to FIG. 7B, a first color filter RCF and a second color filter GCF may be formed on the second base substrate 210 on which the black matrix BM is formed. For example, the first color filter RCF may be formed by coating a photoresist material containing red pigment and/or scattering particles on the second base substrate 210, exposing and developing the photoresist material. The second color filter GCF may be formed by coating a photoresist material containing green pigment and/or scattering particles on the second base substrate 210, exposing and developing the photoresist material.

Figure 7C:
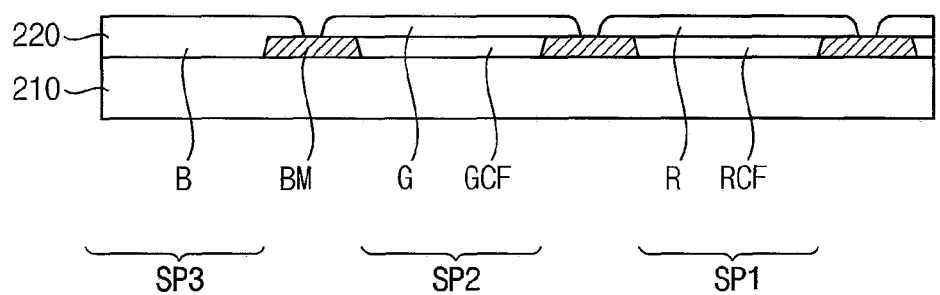

Referring to FIG. 7C, a first color conversion pattern R may be formed on the first color filter RCF. For example, the first color conversion pattern R may be formed by coating a photoresist material containing red quantum dot particles and/or red phosphor on the first color filter RCF, exposing and developing the photoresist material.

A second color conversion pattern G may be formed on the second color filter GCF. For example, the second color conversion pattern G may be formed by coating a photoresist material containing green quantum dot particles and/or green phosphor on the second color filter GCF, exposing and developing the photoresist material.

A third color conversion pattern B may be formed on the second base substrate 210. For example, the third color conversion pattern B may be formed by coating a photoresist material containing blue pigment and/or scattering particles on the second base substrate 210, exposing and developing the photoresist material.

Figure 7D:
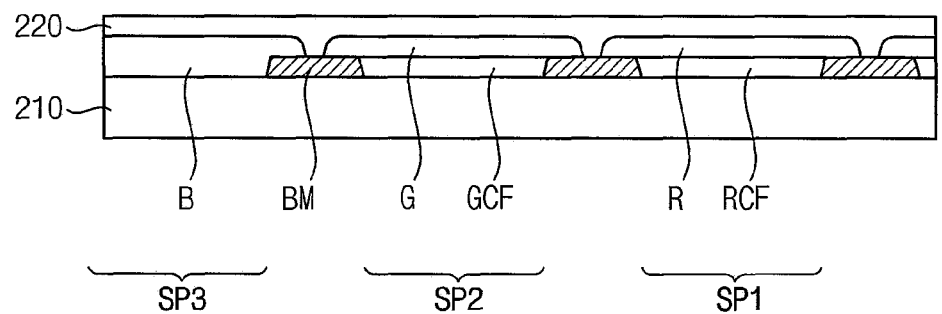

Referring to FIG. 7D, a scattering later 220 may be formed on the first to third color conversion patterns R, G and B. For example, the scattering later 220 be formed by coating a photoresist material containing scattering particles on the first to third color conversion patterns R, G and B, exposing and developing the photoresist material.

Figure 7E:
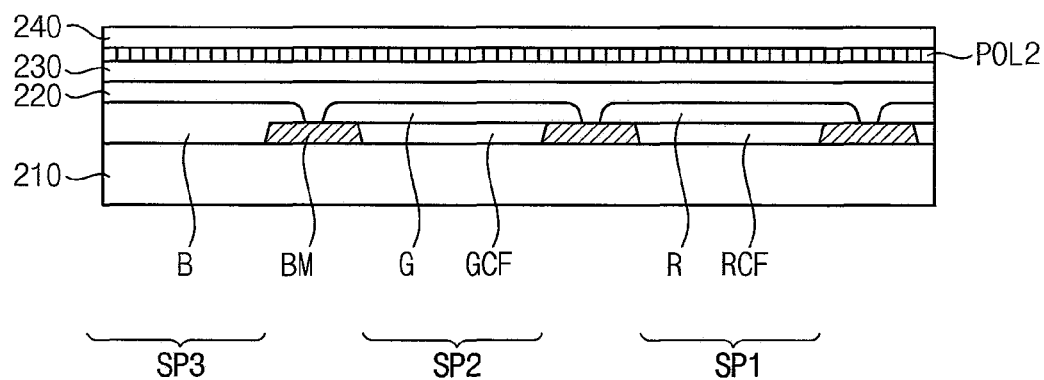

Referring to FIG. 7E, a planarization layer 230 may be formed on the scattering later 220. For example, the planarization layer 230 may be obtained by a spin coating process, a chemical vapor deposition process, a plasma enhanced chemical vapor deposition process, a high density plasma-chemical vapor deposition process, or the like, depending on constituent materials of the planarization layer 230.

A second polarizer POL2 may be formed on the planarization layer 230. The second polarizer POL2 may be a wire grid polarizer. The wire grid polarizer may be formed by forming a metal layer on the planarization layer 230 and then using a nano-imprint lithography method.

A capping layer 240 may be formed on the second polarizer POL2. The capping layer 240 may be obtained by a spin coating process, a chemical vapor deposition process, a plasma enhanced chemical vapor deposition process, a high density plasma-chemical vapor deposition process, or the like, depending on constituent materials of the capping layer 240.

Figure 7F:
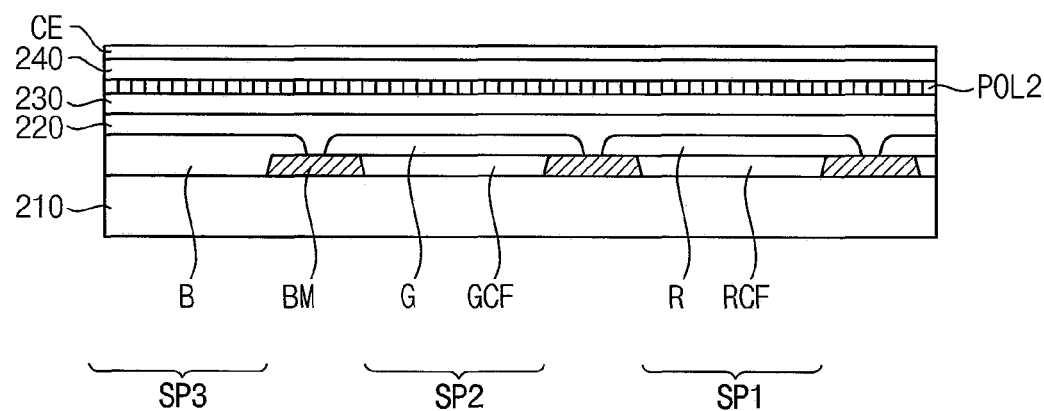
Figure 7G:
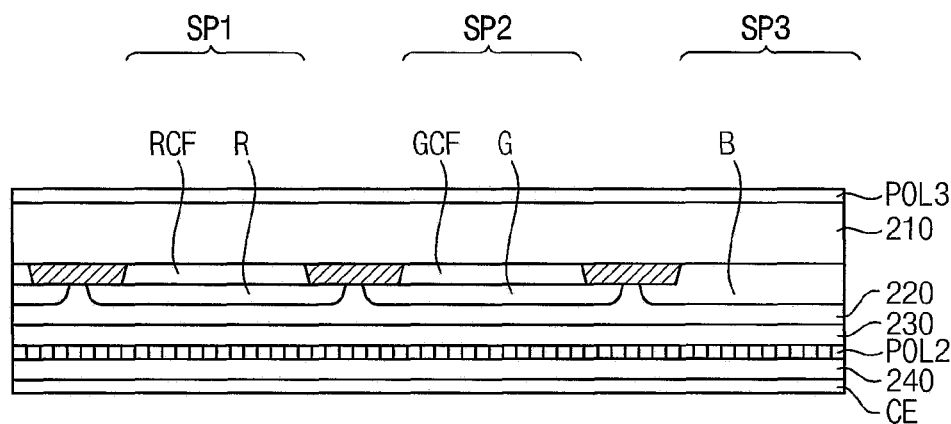

Referring to FIG. 7F, a common electrode CE may be formed on the capping layer 240. For example, the common electrode may be formed by a printing process, a sputtering process, a chemical vapor deposition process, a pulsed laser deposition process, a vacuum evaporation process, an atomic layer deposition process, and etc Referring to FIG. 7G, a third polarizing element POL3 may be formed on a opposite side of one surface of the second base substrate 210 on which the black matrix BM is formed. For example, a general polyvinyl alcohol (PVA) polarizing plate may be attached on the second base substrate 210 to form the third polarizing element POL3.

Figure 7H:
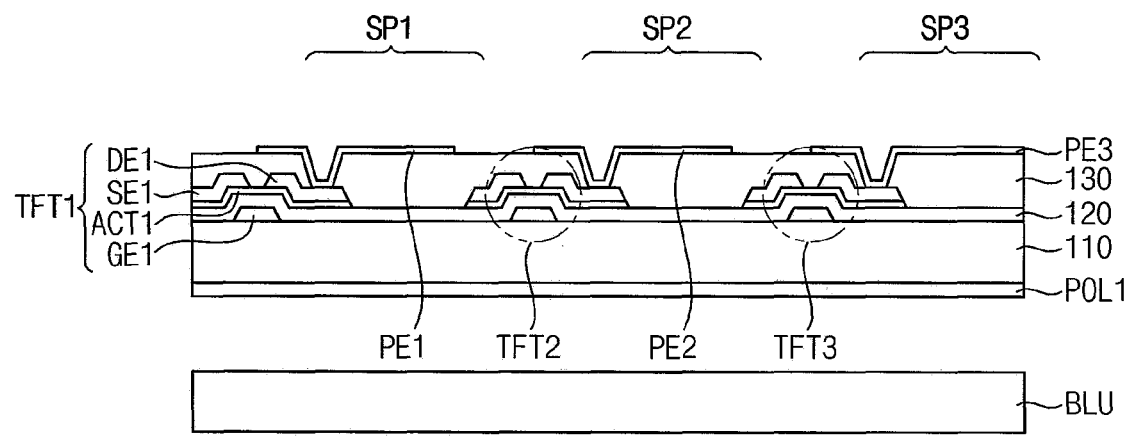

Referring to FIG. 7H, a backlight unit BLU may be provided. The backlight unit BLU may sky blue light by including a light source that generates blue light, a red color conversion material, and a green color conversion material. For example, the backlight unit BLU may include a blue LED chip and an encapsulant in which red and green quantum dot particles and/or phosphors are dispersed and encapsulates the blue LED chip. In some example embodiment, the backlight unit BLU may include a blue LED chip and an encapsulant in which the yellow phosphor is dispersed. In some example embodiments, the backlight unit may include a blue LED chip and a quantum dot sheet disposed on the blue LED.

A gate pattern may be formed on a first base substrate 100. A first insulation layer 120 may be formed on the gate pattern. An active pattern and a data pattern may be formed on the first insulation layer 120. A second insulation layer 130 may be formed on the data pattern. First to third pixel electrodes PE1, PE2 and PE3 may be formed on the second insulation layer 130. The above elements can be formed by a conventional method.

Figure 7I:
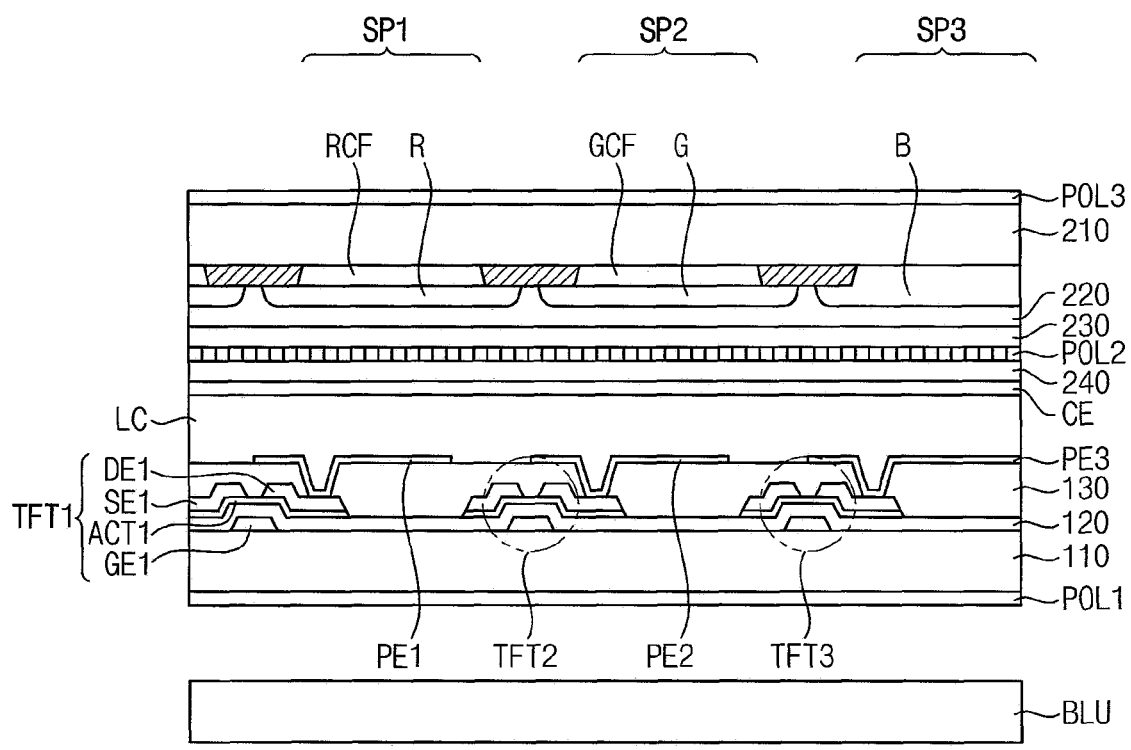

Referring to FIG. 7I, a liquid crystal layer LC may be formed between the first to third pixel electrodes PE1, PE2, and PE3 and the common electrode CE. The liquid crystal layer LC can be formed by a conventional method. Accordingly, the display apparatus may be manufactured.

Figure 8A:
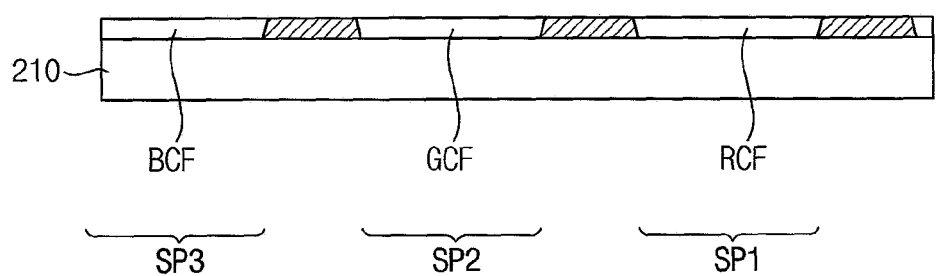
FIGS. 8A, 8B and 8C are cross-sectional views illustrating a method of manufacturing the display apparatus of FIG. 6.
Figure 8B:
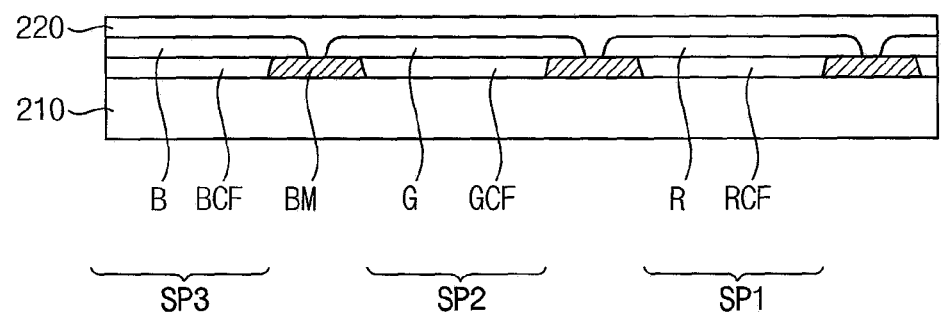
Figure 8C:
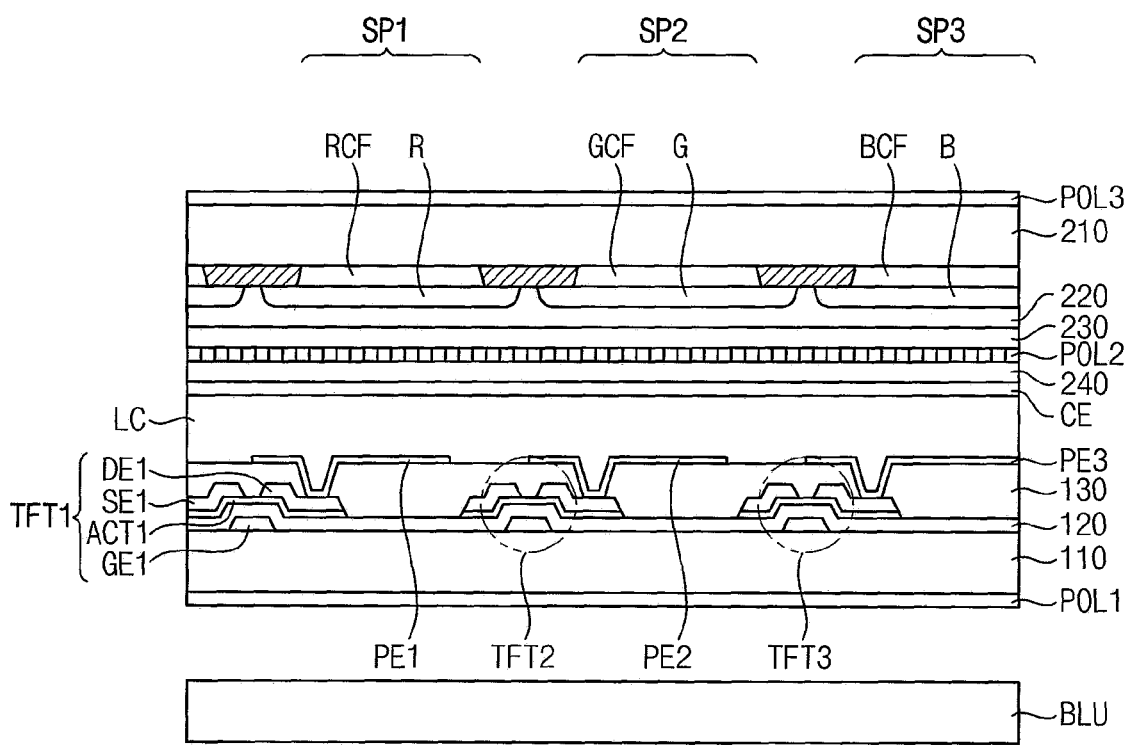

FIGS. 8A, 8B and 8C are cross-sectional views illustrating a method of manufacturing the display apparatus of FIG. 6. The method of manufacturing the display apparatus may be substantially the same as that of FIGS. 7A to 7I, except that the method further includes forming a third color filter BCF instead of blue pigment of the third color conversion pattern B. Thus, any further detailed descriptions concerning the same elements will be omitted Referring to FIG. 8A, a black matrix BM may be formed on a second substrate 210, a first color filter RCF, a second color filter GCF and a third color filter BCF may be formed on the second base substrate 210 on which the black matrix BM is formed. The third color filter BCF may be formed by coating a photoresist material containing blue pigment and/or scattering particles on the second base substrate 210, exposing and developing the photoresist material.

Referring to FIG. 8B, a first color conversion pattern R, a second color conversion pattern G and a third color conversion pattern B may be formed. The third color conversion pattern B may be formed by coating a photoresist material containing blue quantum dot particles and/or blue phosphor on the third color filter BCF, exposing and developing the photoresist material. And then, a scattering later 220 may be formed on the first to third color conversion patterns R, G and B.

Referring to FIG. 8C, a planarization layer 230, a second polarizer POL2, a capping layer 240, a common electrode CE, a third polarizer POL3, a first base substrate 110, a gate pattern, a first insulation layer 120, an active layer, a data pattern, a second insulation layer 130, first to third pixel electrodes PE1, PE2 and PE3, a liquid crystal layer LC, a backlight unit BLU may be formed. Accordingly, the display apparatus may be manufactured.

According to the present inventive concept, a display apparatus includes a backlight unit comprising a light source emitting blue light, a green color conversion material and a red color conversion material, a first polarizer disposed on the backlight unit, a liquid crystal TFT substrate disposed on the first polarizer and including a liquid crystal layer and a thin film transistor, a second polarizer disposed on the liquid crystal TFT, a photoluminescence substrate disposed on the second polarizer and including a first color conversion pattern and a second color conversion pattern disposed on first and second color filters, and a third polarizer disposed on the second base substrate and having a polarizing axis same as a polarizing axis of the second polarizer.

Accordingly, since the display apparatus does not include a ¼ wave polarizer to reduce reflection of external light, the transmittance may be improved, the structure may be simple, and the manufacturing cost may be reduced. In addition, In addition, the transmittance may be improved and the reflection of external light may be prevented by the second polarizer and the third polarizer which have the same polarizing axis, and by the black matrix absorbing light, comparing to the conventional ¼ polarizer.

In addition, a scattering layer may be formed under the first and second color conversion patterns, so that optical efficiency can be improved.

In addition, a blue LED having a maximum peak wavelength of 455 nm or less may be used as the light source of the backlight unit and a blue LED having a maximum peak wavelength of 450 nm which is relatively inexpensive. Thus, the manufacturing cost can be reduced. In addition, since the luminescence efficiency for a short wavelength of a quantum dot is higher than the luminescence efficiency for a long wavelength, so that the luminous efficiency of the first and second color conversion patterns and can be improved as the maximum peak wavelength of the light source is lower than the conventional one.

The foregoing is illustrative of the inventive concept and is not to be construed as limiting thereof. Although a few example embodiments of the inventive concept have been described, those skilled in the art will readily appreciate that many modifications are possible in the example embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific example embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A display apparatus, comprising:
   a light emitting diode including first light emitting units and second light emitting units which are alternately stacked;
   a first color conversion pattern and a second color conversion pattern over the light emitting diode;
   a first color filter over the first color conversion pattern; and
   a second color filter disposed over the second color conversion pattern,
   wherein each of the first light emitting units emits light having a maximum peak wavelength of 455 nm or less, and
   wherein each of the second light emitting units emits light having a wavelength greater than or equal to the maximum peak wavelength.

2. The display apparatus of claim 1, wherein the first light emitting units include a first-first light emitting unit and a first-second light emitting unit, and the second light emitting units include a second-first light emitting unit and a second-second light emitting unit.

3. The display apparatus of claim 2, wherein the first-first light emitting unit, the second-first light emitting unit, the first-second light emitting unit, and the second-second light emitting unit are sequentially stacked.

4. The display apparatus of claim 3, wherein light emitted from the first-first light emitting unit transmits the second-first light emitting unit, light emitted from the second-first light emitting unit transmits the first-second light emitting unit, and light emitted from the first-second light emitting unit transmits the second-second light emitting unit.

5. The display apparatus of claim 2, wherein the second-first light emitting unit, the first-first light emitting unit, the second-second light emitting unit, and the first-second light emitting unit are sequentially stacked.

6. The display apparatus of claim 5, wherein light emitted from the second-first light emitting unit transmits the first-first light emitting unit, light emitted from the first-first light emitting unit transmits the second-second light emitting unit, and light emitted from the second-second light emitting unit transmits the first-second light emitting unit.

7. The display apparatus of claim 1, wherein the light emitting diode emits light having a maximum peak wavelength of 455 nm or less.

8. The display apparatus of claim 1, wherein the first color filter is a red color filter, the second color filter is green color filter, and the first color conversion pattern comprises the red color conversion material and the second color conversion pattern comprises the green color conversion material.

9. The display apparatus of claim 8, wherein the red color conversion material is red quantum dot particles or red phosphor, and the green color conversion material is green quantum dot particles or green phosphor.

10. The display apparatus of claim 9, further comprising a third color conversion pattern over the light emitting diode and comprising scattering particles.

11. The display apparatus of claim 10, wherein the third color conversion pattern further comprises blue pigment.

12. The display apparatus of claim 10, further comprising a third color filter which is a blue color filter disposed on the third color conversion pattern.

13. The display apparatus of claim 10, further comprising:
    a black matrix disposed between the first color filter and the second color filter,
    wherein the black matrix is disposed between the first, second and third pixel areas to divide each of the first to third pixel areas, the first color filter and the first color conversion pattern overlap the first pixel area, the second color filter and the second color conversion pattern overlap the second pixel area, and the third color conversion pattern overlaps the third pixel area.

14. The display apparatus of claim 1, further comprising a scattering layer disposed under the first and second color conversion patterns and comprising scattering particles.

15. The display apparatus of claim 1, further comprising a second base substrate disposed on the first and second color filters.

16. A display apparatus comprising first to third pixel areas, comprising:
    a light emitting diode including first light emitting units and second light emitting units which are alternately stacked;
    first to third pixel electrodes in the first to third pixel areas, respectively;
    first to third thin film transistors electrically connected to the first to third pixel electrodes, respectively;
    a first color conversion pattern over the light emitting diode in the first pixel area;
    a second color conversion pattern over the light emitting diode in the second pixel area;
    a first color filter disposed on the first color conversion pattern; and a second color filter disposed on the second color conversion pattern, wherein each of the first light emitting units emits light having a maximum peak wavelength of 455 nm or less, and wherein each of the second light emitting units emits light having a wavelength greater than or equal to the maximum peak wavelength.

17. The display apparatus of claim 16, wherein the first light emitting units include a first-first light emitting unit and a first-second light emitting unit, and the second light emitting units include a second-first light emitting unit and a second-second light emitting unit.

18. The display apparatus of claim 17, wherein the first-first light emitting unit, the second-first light emitting unit, the first-second light emitting unit, and the second-second light emitting unit are sequentially stacked.

19. The display apparatus of claim 18, wherein light emitted from the first-first light emitting unit transmits the second-first light emitting unit, light emitted from the second-first light emitting unit transmits the first-second light emitting unit, and light emitted from the first-second light emitting unit transmits the second-second light emitting unit.

20. The display apparatus of claim 17, wherein the second-first light emitting unit, the first-first light emitting unit, the second-second light emitting unit, and the first-second light emitting unit are sequentially stacked.

21. The display apparatus of claim 20, wherein light emitted from the second-first light emitting unit transmits the first-first light emitting unit, light emitted from the first-first light emitting unit transmits the second-second light emitting unit, and light emitted from the second-second light emitting unit transmits the first-second light emitting unit.

22. The display apparatus of claim 16, wherein the light emitting diode emits light having a maximum peak wavelength of 455 nm or less.

23. The display apparatus of claim 16, wherein the first color filter is a red color filter, the second color filter is a green color filter, wherein the first color conversion pattern comprises red color conversion material, and the second color conversion pattern comprises green color conversion material, and wherein the red color conversion material is red quantum dot particles or red phosphor, and the green color conversion material is green quantum dot particles or green phosphor.

24. The display apparatus of claim 16, further comprising a third color conversion pattern over the light emitting diode in the third pixel area and comprising scattering particles and blue pigment.

25. The display apparatus of claim 16, further comprising a third color filter which is a blue color filter over the light emitting diode in the third pixel area.

26. The display apparatus of claim 16, further comprising:
a second base substrate over the first and second color filters.

* * * * *